United States Patent Office 3,210,297
Patented Oct. 5, 1965

3,210,297
METHOD FOR POLYMERIZING CYCLIC ETHERS AND CYCLIC ACETALS IN THE PRESENCE OF BORON TRIFLUORIDE
Edgar Fischer, Klaus Küllmar, and Klaus Weissermel, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 26, 1960, Ser. No. 45,270
Claims priority, application Germany, July 30, 1959, F 29,056
8 Claims. (Cl. 260—2)

The present invention relates to a method of polymerizing cyclic ethers and cyclic acetals with the aid of aryldiazonium fluoroborates.

We have found that aryldiazonium fluoroborates carrying appropriate substituents can be contacted with a compound or compounds to be polymerized without immediate polymerization taking place. Rather, polymerization is initiated by the use of an additional polymerization activating agent. Such additional activation may be brought about by supplying energy in the form of heat and/or light.

We have also found that aryldiazonium fluoroborates exhibit a very different reactivity depending on the constitution and structure of their aryl radical or the substituents linked to said aryl radical. Those aryldiazonium fluoroborates are suitably classified as follows:

Group 1.—Monomer-insoluble aryldiazonium fluoroborates which can be activated preferably by thermal means.

Group 2.—Monomer-soluble aryldiazonium fluoroborates which can be activated preferably by thermal means.

Group 3.—Monomer-soluble aryldiazonium fluoroborates which can be activated by light and thermal means.

Group 4.—Monomer-soluble aryldiazonium fluoroborates which cannot be activated by thermal means or are difficult to activate by thermal means but can be activated by light.

Aryldiazonium fluoroborates which can be activated by thermal means or light are those compounds which are themselves catalytically inactive but which are decomposed under the action of heat or light, whereby the activating system that initiates polymerization, for example, the polymerization of cyclic acetals, is obtained. The following scheme of formulae may be used for demonstrating the decomposition of aryldiazonium fluoroborates:

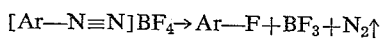

$$[Ar-N\equiv N]BF_4 \rightarrow Ar-F + BF_3 + N_2\uparrow$$

In other words, crystalline aryldiazonium fluoroborates may be considered as constituting well defined carrier substances of Lewis acids. They are potential ionic catalysts. They can readily be prepared, added in exact dosages, exhibit good storability and often monomer-solubility and they, therefore, constitute especially valuable catalysts for use in ionic polymerization processes, especially for polymerizing cyclic ethers and cyclic acetals.

The aryldiazonium fluoroborates of Group 1 are of minor commercial interest since due to their insolubility in monomers they cannot be distributed in an absolutely uniform manner in the monomer used, so that a substantially homogeneous polymerization cannot practically be obtained. They are, therefore, far from being superior under comparable conditions to pure, gaseous boron fluoride, for example in acetal polymerization.

Much more effective are the monomer-soluble thermoactive aryldiazonium salts of Group 2 which due to their good dosability and homogeneous distribution in the monomer used or in a mixture of monomers are by far superior to gaseous boron fluoride under otherwise comparable conditions. Because the ability of aryldiazonium fluoroborates to undergo thermal decomposition is substantially determined by their constitution, it is possible to synthesize aryldiazonium fluoroborates which undergo decomposition at a temperature within the range of about 20° C. and 140° C., for example, the selection of that aryldiazonium fluoroborate which is suitable for use in the polymerization being substantially dependent on the temperature desired for initiating polymerization. Those aryldiazonium fluoroborates which decompose at temperatures within the range indicated above are preferably used, but aryldiazonium fluoroborates having a lower or higher decomposition temperature may also be used.

The aryldiazonium fluoroborates of Group 3 which are monomer-soluble, thermo-active and light-active are in some instances superior to those of Group 2; in the case of a polymerization, for example, which proceeds slowly and has been thermally activated, polymerization may be further promoted by light activation.

The bulk polymerization of a plurality of monomers, for example cyclic acetals, advantageously trioxane, is of considerable technical interest in view of the good space-time yields obtained with a minimum catalyst consumption. For such a polymerization it was essential to prepare those aryldiazonium fluoroborates which are classified in Group 4.

Bulk polymerizations carried out in the presence of those aryldiazonium fluoroborates which belong to Groups 1–3 above, that is in the presence of those compounds which are monomer-soluble or insoluble and thermally instable, involve the disadvantage on a pilot plant or on an industrial plant scale that after initiation of the exothermal polymerization, the decomposition of the diazonium salts can only be controlled with difficulty because dissipation of the polymerization heat as it evolves can only be achieved with great expenditure of apparatus.

This disadvantage can be overcome by using the aryldiazonium fluoroborates of Group 4. These aryldiazonium fluoroborates can be dissolved in a monomer or monomer mixture at the polymerization temperature used. Subsequently, polymerization may be initiated by light whenever and wherever desired.

The structure, nature, and number of substituents in the aryldiazonium fluoroborates not only account for the solubility and activation by thermal means or light of those salts in the monomer or monomer mixture used, but also for the activity of the catalyst system which is decomposed and thereby rendered active. Those substituents at the aromatic system which are active electron donors may impair the activity of the diazonium salts.

It is emphasized, however, that the polymerization, for example of cyclic acetals, may even be initiated using those aryldiazonium fluoroborates which contain in the molecule a NH$_2$— grouping that acts as Lewis base, for example compound No. 30 listed in the table below.

Mixtures of various aryldiazonium fluoroborates, for example mixtures of fluoroborates which are preferably activated by thermal means with fluoroborates which are preferably activated by light, may also be used.

An aryldiazonium salt is termed monomer-soluble provided that it dissolves homogeneously at the polymerization temperature in the amount of monomer necessary for initiating polymerization. The proportion in which the polymerization activator or activators is used may vary within wide limits. Polymerization may even be initiated by adding traces of the above catalysts. When the catalysts are used in a proportion of between about 0.0001 mol percent and about 5 mol percent, advantageously 0.001 mol percent and about 1 mol percent, the polymerization proceeds at an industrially useful rate.

The catalysts used in accordance with this invention can be used for polymerizing a series of monomers, for example isobutylene, styrene or vinyl ethers, especially for polymerizing cyclic compounds which contain oxygen in the ring, such as cyclic acetals and cyclic ethers. The process of this invention is especially suitable for bulk-polymerizing trioxan, polymers having very good properties being obtained.

The process described in this invention can be used for homopolymerizing or copolymerizing cyclic acetals, for example trioxan, or cyclic ethers, such as tetrahydrofuran. The catalyst may also be used for polymerizing with one another monomers which simultaneously have the structure of a cyclic ether and a cyclic acetal, for example diethylene glycol formal of the formula

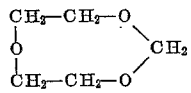

Those monomers may also be copolymerized with cyclic acetals, for example trioxane, or cyclic ethers, for example tetrahydrofuran.

In many cases, it is advantageous, for example in the polymerization of tetrahydrofuran, to use the catalysts together with a catalyst yielding protons or carbonium ions, for example epichlorhydrin or chloromethylethylene glycol carbonate.

The products obtained by this invention can be used for making shaped articles, fibers and films.

The process of this invention can also be used for modifying or surface-coating shaped structures, such as films, foils, fibers or wires. These structures may be impregnated or sprayed, for example, with a mixture prepared from one or more monomers in which an aryldiazonium fluoroborate is dissolved, and polymerization may be initiated by heat and/or light. Those structures may also be covered with masks or partially exposed to light so as to obtain local polymer formation.

Aryldiazonium fluoroborates which are capable of being activated by light are those compounds that decompose under the action of normal sun-light. Other light sources, for example a commercial metal-filament lamp or a luminous arc of sufficient capacity may, however, also be used. Furthermore, it may be advantageous to increase the proportion of infrared or ultraviolet light in the light source depending on the spectrum sensitiveness of the aryldiazonium fluoroborate used.

The table below is a qualitative survey of the solubility and thermal and light activation of a series of aryldiazonium fluoroborates which may be used in this invention. In the solubility tests, diethylene glycol dimethyl ether was used as the solvent at a temperature of 20° C. The ether exhibits a medium dissolving power for aryldiazonium fluoroborates.

There are monomers which exhibit a very pronounced dissolving power, especially at slightly raised temperatures, for example for trioxane, and in which all diazonium compounds except for compound No. 1 below dissolve to a degree necessary for polymerization; those compounds which are only soluble in monomers having a high dissolving power have been marked with (+). The sign (+) — means insoluble in diethylene-glycol dimethylether but soluble in a trioxane melt at about 70° C.

The thermal activation indicated in the table below has been determined with trioxane at a temperature of 60–70° C. with the exclusion of light. The number of (+) signs indicated in column I of the table give a comparison standard as to the polymerization rates obtained with various aryldiazonium fluoroborates. One (+) sign means that polymerization did not occur even after a prolonged time (about 12 hours).

The term "light activation" as used in the table below is intended to mean additional acceleration of the polymerization by exposure to sun-light under otherwise the same conditions as are used to determine the thermal activation. The number of (+) signs in column II indicate a standard as regards activation of the respective compound by light.

The following examples serve to illustrate the invention, but they are not intended to limit it thereto, the parts being by weight unless otherwise stated:

*Example 1*

100 parts trioxane were melted and 0.002 part benzene-diazonium fluoroborate (compound 1 of the table below) was added at 68° C. as catalyst while stirring. The catalyst did not dissolve. Polymerization set in after about 5 minutes and the reaction mixture solidified after a short time to a solid block of polymer. After 15 minutes, the polymer was comminuted and ground as finely as possible. The ground polymer was then boiled for about 1 hour under reflux with a 2% solution of ethanolamine in methanol, filtered off with suction, and washed with methanol until neutral. The product which was dried at 50° C. in vacuo underwent a loss of 0.33% by weight per minute at 202° C. The yield was 75 parts by weight.

*Example 2*

(a) 100 parts trioxane were melted and 0.005 part 4-nitro-2-methoxyphenyl-diazonium fluoroborate (compound 9 of the table below) were added at 68° C. as catalyst. The catalyst dissolved immediately and polymerization set in after about 2 minutes. The reaction mixture was then worked up in the manner set forth in Example 1. The resulting reaction product underwent a loss of 0.06% by weight per minute at 202° C. The yield was 91 parts by weight.

(b) In a parallel test which was carried out under otherwise the same conditions an equimolecular amount of $BF_3$-gas was substituted for 0.005 part 4-nitro-2-methoxy-phenyl-diazonium fluoroborate. The resulting polymer underwent a loss of 0.25% by weight per minute at 202° C.

On comparing Example 2a with Example 1 and Example 2b, it is evident that it is more advantageous to use monomer-soluble aryldiazonium fluoroborates which yield polymers that posses a substantially improved thermal stability.

*Example 3*

100 parts trioxane were melted and 0.005 part of a compound having the following formula:

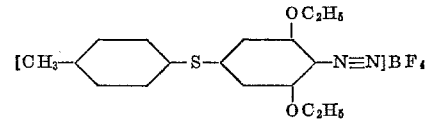

(compound 21 of the table below) was added at 69° C. as catalyst. The catalyst dissolved immediately. The reaction mixture was then divided into two halves and each half was introduced into a vessel made of Jena glass. Vessel (1) was stored in a thermostat at 68° C. with exclusion of light. Vessel (2) was exposed to the irradiation of a normal 250 watt lamp at a distance of 30 cm. In the irradiated vessel polymerization set in after about 3 minutes, turbidity phenomena being observed. In vessel (1) no signs of polymerization were observed after 100 minutes. After that time, vessel (1) was irradiated under the same conditions as vessel (2). Polymerization set in after about 3 minutes and the batch solidified after a short time to a solid block.

*Example 4*

2.5 parts absolute diethylene glycol formal were mixed at 20° C. with 0.002 part of a compound having the following formula:

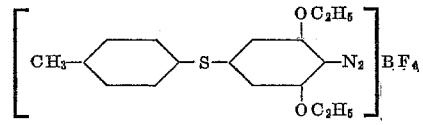

and 0.2 part of a compound having the formula:

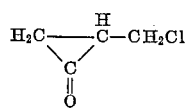

The slightly yellowish solution so obtained was then irradiated with an ultraviolet mercury lamp until it was decolorized (about 60–75 seconds). Polymerization set in after a short time and the solution finally solidified to a solid colorless mass which commenced slowly to crystallize.

After 24 hours, the polymer obtained was dissolved in acetone which contained 1% by weight ethanolamine, and precipitated in petroleum ether at a temperature below 0° C. The polymer was worked up, dried in vacuo and a wax having a melting point of 35–45° C. was obtained in a yield of 85–95%, calculated on diethylene glycol formal.

*Example 5*

2.5 parts absolute diethylene glycol formal were mixed at 20° C. with 0.004 part of a compound having the formula:

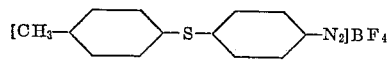

The yellow solution so obtained was irradiated with an ultraviolet mercury lamp until decolorized (about 100–120 seconds). Polymerization set already in during irradiation. During polymerization, the polymer solidified to a solid, colorless block which had substantially crystallized after 24 hours.

The resulting product was worked up in the manner described in Example 1. The yield was 95% by weight calculated on diethylene glycol formal.

*Example 6*

2.4 parts absolute tetrahydrofuran were mixed at 20° C. with 0.025 part of a compound having the formula:

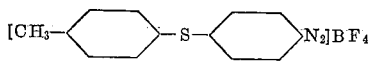

and 0.03 part of a compound having the formula:

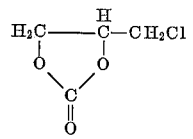

and 0.01 part of a compound having the formula:

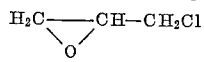

and the resulting yellow solution was irradiated with an ultraviolet mercury vapor lamp until decolorized. Polymerization set in after a short time and the whole batch became thickly liquid within a few hours. After 24 hours, the batch was mixed with water and unreacted monomer was expelled by means of steam.

The resulting polymer solidified after cooling to a solid, wax-like mass which was dried in vacuo. The yield was 50% by weight calculated on tetrahydrofuran.

*Example 7*

10 parts vinyl-β-chloroethylether $$CH_2=CHO-CH_2CH_2Cl$$

were heated in a cylindrical glass vessel with 0.05 part 3-carbomethoxy-benzene-diazonium fluoroborate (compound 3 of the table below). At about 50–60° C. a strong exothermal reaction set in which become so violent in spite of the heat supply being interrupted that a part of the product was tossed out of the vessel. The reaction product obtained was a brown-colored resin.

| No. | | Solubility in diethyleneglycol dimethyl ether | I Thermal activation (trioxan at 60–70° C.) | II Light activation (trioxan at 60–70° C.) |
|---|---|---|---|---|
| 1 | [⟨◯⟩—N≡N]BF₄ | — | ++ | + |
| 2 | [⟨◯⟩—N≡N]BF₄ with COOCH₃ | ++ | ++++ | + |
| 3 | [⟨◯⟩—N≡N]BF₄ with COOCH₃ | +++ | ++++ | + |
| 4 | [CH₃OOC—⟨◯⟩—N≡N]BF₄ | (+) | ++++ | + |
| 5 | [⟨◯⟩—N≡N]BF₄ with NO₂ | ++ | ++++ | + |
| 6 | [⟨◯⟩—N≡N]BF₄ with NO₂ | (+) | +++ | + |
| 7 | [O₂N—⟨◯⟩—N≡N]BF₄ | (+) | ++++ | + |
| 8 | [O₂N—⟨◯⟩—N≡N]BF₄ with CH₃ | ++ | ++ | + |

| No. | Structure | Solubility in diethyleneglycol dimethyl ether | I Thermal activation (trioxan at 60–70° C.) | II Light activation (trioxan at 60–70° C.) |
|---|---|---|---|---|
| 9 | [O$_2$N–C$_6$H$_3$(OCH$_3$)–N≡N]BF$_4$ | ++ | ++++ | + |
| 10 | [2-NO$_2$, 6-CH$_3$-C$_6$H$_3$–N≡N]BF$_4$ | + | +++ | + |
| 11 | [3-Cl-C$_6$H$_4$–N≡N]BF$_4$ | (+)– | + | + |
| 12 | [4-Cl-C$_6$H$_4$–N≡N]BF$_4$ | (+)– | + | + |
| 13 | [2-CF$_3$, 4-Cl-C$_6$H$_3$–N≡N]BF$_4$ | (+)– | ++ | + |
| 14 | [2,4-(CF$_3$)$_2$-C$_6$H$_3$–N≡N]BF$_4$ | (+)– | +++ | + |
| 15 | [2-SO$_2$C$_2$H$_5$, 4-CF$_3$-C$_6$H$_3$–N≡N]BF$_4$ | +++ | ++ | + |
| 16 | [2-OCH$_3$, 5-SO$_2$N(C$_2$H$_5$)$_2$-C$_6$H$_3$–N≡N]BF$_4$ | ++ | ++++ | + |
| 17 | [N≡C–C$_6$H$_2$(OCH$_3$)$_2$–N≡N]BF$_4$ | ++++ | ++++ | + |
| 18 | [C$_6$H$_5$–C$_6$H$_4$–N≡N]BF$_4$ | ++++ | ++ | + |
| 19 | [C$_6$H$_5$–C(O)–NH–C$_6$H$_2$(OCH$_3$)$_2$–N≡N]BF$_4$ | ++ | + | +++ |
| 20 | [C$_6$H$_5$–NH–C$_6$H$_4$–N≡N]BF$_4$ | ++++ | + | ++ |
| 21 | [CH$_3$–C$_6$H$_4$–S–C$_6$H$_2$(OC$_2$H$_5$)$_2$–N≡N]BF$_4$ | ++++ | (+) | ++++ |
| 22 | [CH$_3$–C$_6$H$_3$(NO$_2$)–N=N–C$_6$H$_2$(CH$_3$)(OCH$_3$)–N≡N]BF$_4$ | +++ | +++ | + |

| No. | | Solubility in diethylene-glycol dimethyl ether | I Thermal activation (trioxan at 60-70° C.) | II Light activation (trioxan at 60-70° C.) |
|---|---|---|---|---|
| 23 | 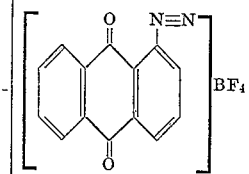 | (+)− | ++ | + |
| 24 | 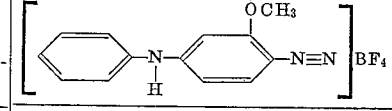 | ++++ | + | + |
| 25 | 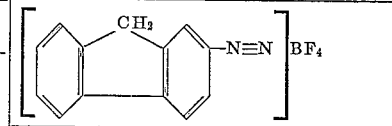 | +++ | + | + |
| 26 | 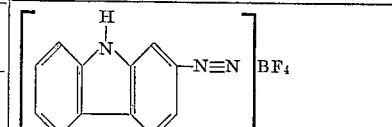 | ++++ | + | + |
| 27 | 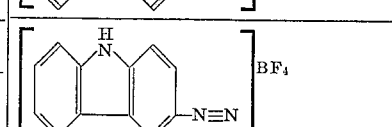 | +++ | + | + |
| 28 | 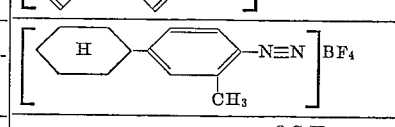 | ++ | ++++ | + |
| 29 | 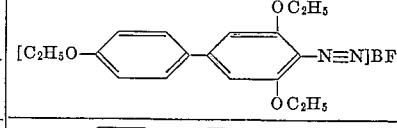 | +++ | ++ | + |
| 30 | 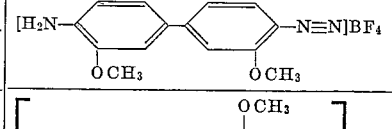 | (+) | + | + |
| 31 | 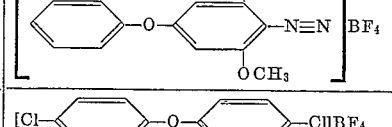 | +++ | ++ | + |
| 32 | 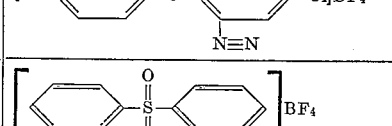 | ++++ | ++ | + |
| 33 | 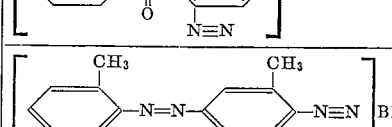 | ++++ | ++ | + |
| 34 | 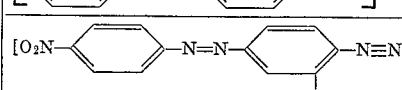 | ++ | +++ | + |
| 35 |  | ++ | ++++ | + |
| 36 | 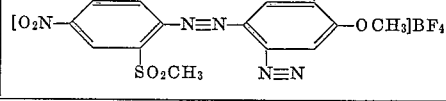 | ++ | +++ | + |

We claim:
1. In a process for polymerizing a fluid monomer adaptable to ionic polymerization in the presence of $BF_3$, said monomer being selected from the group consisting of tetrahydrofuran and cyclic acetals having 6 to 8-membered rings, the improvement which comprises dispersing an aryldiazonium fluoroborate in said monomer and then decomposing said fluoroborate to form $BF_3$ in said monomer by irradiation thereof with radiant energy comprising wave lengths between the wave lengths of infrared and ultraviolet light.

2. The process of claim 1, wherein the aryldiazonium fluoroborate is decomposed by heat.

3. The process of claim 1, wherein the aryldiazonium fluoroborate is decomposed by light.

4. The process of claim 1, wherein the aryldiazonium fluoroborate is decomposed by the combined action of light and heat.

5. A process as in claim 1 wherein said monomer is selected from the group consisting of trioxane, tetrahydrofuran, and diethylene glycol formal.

6. A process as in claim 1 wherein said monomer is trioxane.

7. A process as in claim 1 wherein said monomer is tetrahydrofuran.

8. A process as in claim 1 wherein said monomer is diethylene glycol formal.

References Cited by the Examiner

UNITED STATES PATENTS

| | | | |
|---|---|---|---|
| 2,691,038 | 10/54 | Englehardt | 260—2 |
| 2,936,298 | 5/60 | Hudgin et al. | 260—67 |
| 2,951,059 | 8/60 | Axtell et al. | 260—67 |
| 3,027,352 | 3/62 | Walling et al. | 260—67 |

FOREIGN PATENTS

| | | |
|---|---|---|
| 1,243,668 | 9/60 | France. |
| 914,435 | 7/54 | Germany. |

OTHER REFERENCES

Marvel et al.: American Chemical Society Journal, 75, July-September 953 (pages 3846–3848 relied on).

WILLIAM H. SHORT, *Primary Examiner.*

MILTON STERMAN, H. N. BURSTEIN, *Examiners.*